(12) United States Patent
McLeod et al.

(10) Patent No.: US 11,369,909 B2
(45) Date of Patent: Jun. 28, 2022

(54) SMART AIR FILTER AND SYSTEMS AND METHODS FOR PREDICTING FAILURE OF AN AIR FILTER

(71) Applicant: ConnectM Technology Solutions, Inc., Marlborough, MA (US)

(72) Inventors: Will McLeod, Hoboken, NJ (US); Ryan Fant, Chicago, IL (US); Nayeem Hussain, Union City, NJ (US); Anthony Dzaba, Brooklyn, NY (US)

(73) Assignee: CONNECTM TECHNOLOGY SOLUTIONS, INC., Marlborough, MA (US)

( * ) Notice: Subject to any disclaimer, the term of this patent is extended or adjusted under 35 U.S.C. 154(b) by 626 days.

(21) Appl. No.: 15/399,474

(22) Filed: Jan. 5, 2017

(65) Prior Publication Data
US 2017/0189844 A1     Jul. 6, 2017

Related U.S. Application Data

(60) Provisional application No. 62/275,032, filed on Jan. 5, 2016.

(51) Int. Cl.
*B01D 46/00*      (2022.01)
*B01D 46/46*      (2006.01)
(Continued)

(52) U.S. Cl.
CPC ..... *B01D 46/0086* (2013.01); *B01D 46/0032* (2013.01); *B01D 46/0036* (2013.01);
(Continued)

(58) Field of Classification Search
CPC ............... B01D 46/00; B01D 46/0086; B01D 46/0032; B01D 46/0036; B01D 46/008; B01D 46/448; B01D 46/46; B01D 2275/10; B60H 3/06–0658; B60H 2003/065–0691
(Continued)

(56) References Cited

U.S. PATENT DOCUMENTS

| 2008/0014853 | A1* | 1/2008 | Kim | ................... B60H 1/00764 454/86 |
| 2008/0114853 | A1* | 5/2008 | Holt | ................... H04L 67/1097 709/214 |

(Continued)

*Primary Examiner* — T. Bennett McKenzie
(74) *Attorney, Agent, or Firm* — Myers Wolin, LLC

(57) ABSTRACT

Systems and methods are provided for predicting failure of an air filter within an HVAC installation. Also provided are methods for calibrating the systems described. The system provided typically includes air filters and vents, and a processor at an application server configured to implement methods described. Each vent may include various sensors, such as a temperature sensor or a sensor for evaluating indoor air quality. The method may receive information about a total volume of air pumped by an HVAC system over time, determine the volumetric quantity of air passing through a particular filter, and compare that quantity of air to a threshold amount representing the lifetime, or some percentage of the lifetime of the filter. Where the system includes multiple vents and multiple filters, the system may implement a model for calculating the volumetric quantity of air associated with each individual filter.

12 Claims, 8 Drawing Sheets

(51) Int. Cl.
  *B01D 46/44* (2006.01)
  *B01D 46/88* (2022.01)
  *B60H 3/06* (2006.01)
(52) U.S. Cl.
  CPC .......... *B01D 46/448* (2013.01); *B01D 46/46* (2013.01); *B01D 46/88* (2022.01); *B01D 2275/10* (2013.01); *B60H 3/0616* (2013.01)
(58) Field of Classification Search
  USPC ........................................................ 95/1–24
  See application file for complete search history.

(56) References Cited

U.S. PATENT DOCUMENTS

2010/0216386 A1* 8/2010 Bruss ................ B60H 1/00857
  454/155
2010/0288468 A1* 11/2010 Patel ...................... B01D 46/10
  165/59
2012/0060695 A1* 3/2012 Hepburn ................... A61L 9/16
  96/222

\* cited by examiner

SMART AIR FILTER AND SYSTEMS AND METHODS FOR PREDICTING FAILURE OF AN AIR FILTER

CROSS-REFERENCE TO RELATED APPLICATION

This application claims the benefit of U.S. Provisional Application No. 62/275,032, filed on Jan. 5, 2016, the contents of which are incorporated by reference herein.

FIELD OF THE INVENTION

The invention relates to predicting failure of an air filter used in an HVAC system.

BACKGROUND

The U.S. Environmental Protection Agency ranks indoor air pollution as one of the top threats to human health. In fact, the levels of indoor air pollutants can be two to five times greater than outdoor levels, and sometimes as high as 100 times greater.

Poor indoor air quality from toxic agents such as benzene (found in glue, paint and automobile fumes), formaldehyde (found in particleboard, some foam insulation, paper products, paints/varnishes and permanent press fabric), and trichloroethylene (found in paint remover and dry cleaning solutions), has been linked to health problems, including asthma, headaches, and chemical hypersensitivity.

In addition to the harmful effects from toxic agents, one in five Americans suffer from allergies or asthma symptoms. Allergies ranks 5th among other leading chronic diseases in the U.S. with an estimated annual cost to the health care system and businesses of $7.9 billion.

While a variety of air filtration products exist, each has severe shortcomings and none are sufficiently tech-enabled.

While standalone air filters are available in a wide variety of forms, are portable, and may provide good circulation, they provide severely limited functionally. Such standalone units are only effective in the room they are in, and it is expensive and inefficient to provide a unit for each room in a house. The upfront cost of such systems is high, and replacing air filters can be expensive. Further, many of these systems have moving parts that can fail, take up space in the room they are used for, and are overly noisy.

Traditional air vent filters may be used in any room with an air vent, but are typically not designed to preserve airflow of an HVAC system and may therefore dangerously increase the pressure in the system and cause system failures. Such filters may also be difficult and tedious to install, and may require the removal of an entire air vent to change the filter when the filter fails and requires changing. It may also be difficult to determine when such a filter requires replacement.

Decontamination sprays may be used in a variety of systems, such as window mounted air conditioner units, and can be used as a general cleaner as well. However, the efficacy of such sprays is not proven, and the spray must be applied regularly, which is tedious.

There is a need for a filter system that can be easily installed or incorporated into existing systems, easily monitored to determine when filters must be replaced, and which does not decrease the utility of any existing system to which it is applied.

SUMMARY

Systems and methods are provided for predicting failure of an air filter within an HVAC installation. Also provided are methods for calibrating the systems described.

The system provided typically includes air filters each comprising filtering material and a frame supporting the filtering material and vents that retain corresponding air filters and each including a border configured to mate with the frame of the corresponding air filter. The system further comprises a processor at an application server configured to implement the various methods described, and may further include connected thermostats and a mobile application, each connected to a network including the application server.

Each vent may include various sensors, such as a temperature sensor or a sensor for evaluating indoor air quality.

The system may implement a method for predicting failure of a filter which receives information about a total volume of air pumped by an HVAC system over time, determining the volumetric quantity of air passing through the vent corresponding to the filter, and comparing that quantity of air to a threshold amount representing the lifetime, or some percentage of the lifetime of the filter. The method may then trigger a warning to a user of the system or a purchase of a replacement filter. Where the system includes multiple vents and multiple filters, the system may implement a model for calculating the volumetric quantity of air associated with each individual vent or filter and may compare the resulting value to the threshold amount. Such a model may be dynamic, and may take into account the position of louvers of each vent.

In some embodiments, the method may separately evaluate a rate of change of indoor air quality at the filter and may trigger an alert to a user or a purchase of a replacement filter where the rate of change is above a threshold rate.

The method described may leverage various models for determining an amount of airflow through each vent. Accordingly, methods are providing for calibrating those models. In one embodiment, such a method may monitor a temperature at each of several vents in an HVAC system, close one of those vents, and rank the remaining vents according to a magnitude of change in the temperatures at each of those vents. The method may then open the vent previously closed and close a second vent, and again rank the remaining vents so as to incorporate the previously closed vent. Such rankings may be weighted based on the relative magnitude of temperature changes at each vent.

An alternate calibration method may comprise determining a heat transfer characteristic for each of several rooms, each room corresponding to a vent, monitoring the temperature in each of those rooms, instructing the HVAC system to supply hot or cold air to each room, and determining the air flow into each room based on the resulting change in temperature and the corresponding heat transfer characteristic.

Such a heat transfer characteristic may be based, for example, on room dimensions, room elevation, and geographical location of the room.

DETAILED DESCRIPTION OF THE PREFERRED EMBODIMENTS

Figure 1:
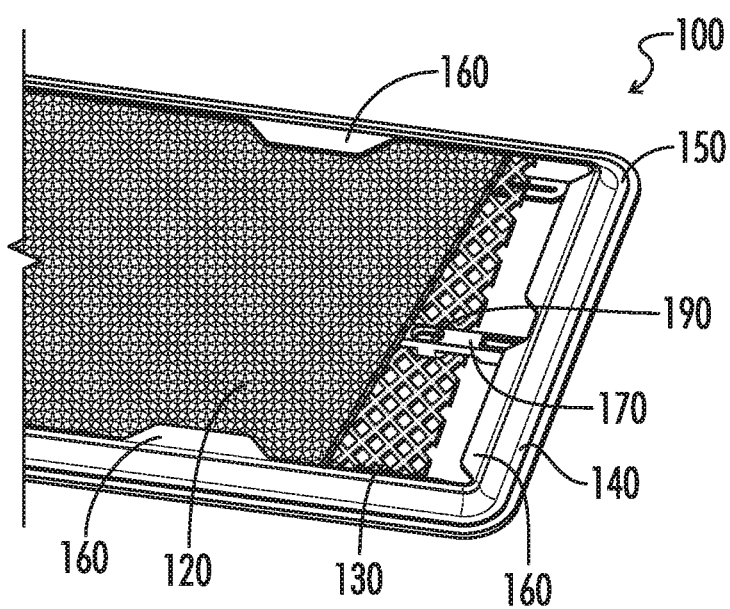
FIG. 1 is an air filter in accordance with this disclosure.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

Air filters may be applied to existing vents within an HVAC system. Such air filters should be designed for high air flow, while also providing advanced filtration against common household contaminants like pollen, lint, household dust, dust mite debris, and mold spores. Such filters may also contain an active carbon layer to remove offensive odors and eliminate common household toxins like benzene, formaldehyde, and trichloroethylene.

Accordingly, such filters may comprise two layers, including a first layer, an electrostatic high air flow material, and a second layer, an active carbon layer. The configuration and construction of such a filter will be described in more detail below.

The air filter may be designed to seamlessly "click" into the faceplate of a corresponding vent, and the vent may be provided with a removable faceplate. Further, such air filters may be incorporated into air filter systems that monitor the vents and alert users when filters installed within those vents should be replaced. Such systems may also trigger an alert when a filter may be replaced, and may further transmit an order to a vendor instructing them to send a replacement filter. This may be governed by subscription plans, and may be based on real-time HVAC usage analysis, when such data is available. Further, filter status may be incorporated into the interface of the HVAC system as a whole, such that a smart phone application governing the HVAC system may further provide users with the status of vents so users can track vent replacement cycles.

Figure 2:
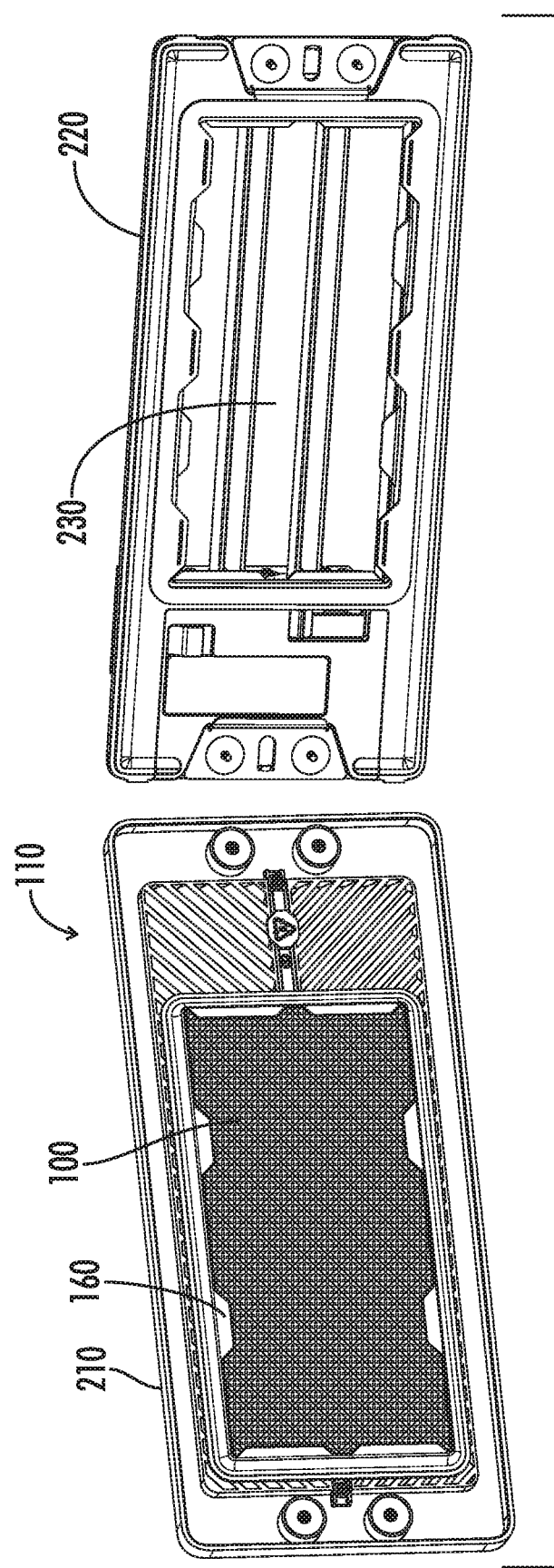
FIG. 2 is a vent for an HVAC system with the filter of FIG. 1 installed.
Figure 3:
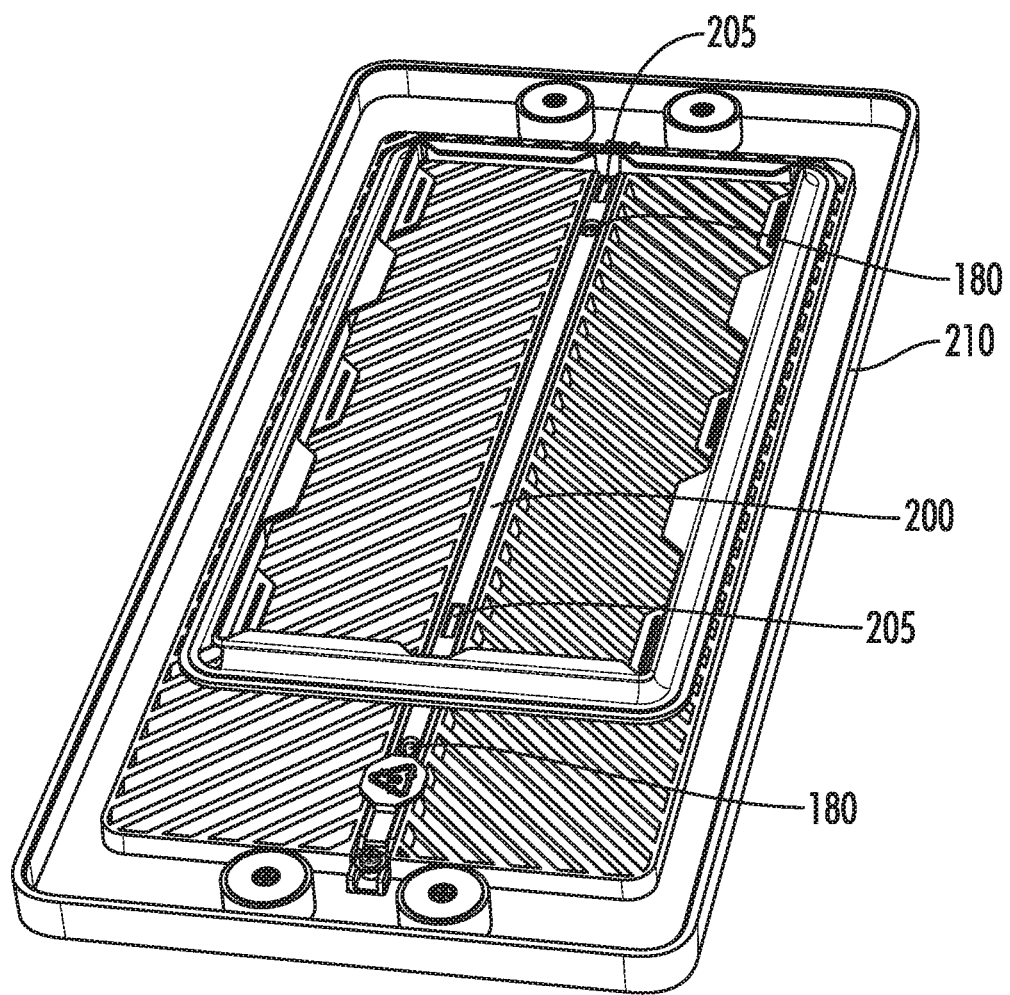
FIG. 3 shows a frame for the air filter of FIG. 1 mating with the vent frame of FIG. 2.

Such filters may utilize materials designed for high air flow such that they can purify the air without overloading an existing HVAC system. Further, the use of such vents with antimicrobial properties at each vent in the HVAC system consistently removes toxins and prevents germs from spreading through a user's home FIG. 1 is an air filter 100 in accordance with this disclosure, and FIGS. 2 and 3 show a vent 110 for an HVAC system with the filter 100 installed or mating with the vent frame.

The air filter 100 comprises a layer of high airflow electrostatically charged filtering material 120 and an active carbon layer 130. The high airflow material 120 removes common household contaminants by electrostatically attracting such contaminants to the material. This approach does not filter out contaminants by preventing them from passing through a fine mesh, as in traditional filters, but rather attracts such contaminants towards the surface of a much coarser mesh. The coarser mesh of the high airflow material 120 therefore does not restrict airflow through the vent 110 in which it is installed. The active carbon layer 130, on the other hand, removes offensive odors and common household toxins, but also provides a coarser mesh than traditional filters do, thereby preventing the filter from unduly restricting airflow and increasing pressure in an HVAC system in which they are installed.

The layers of material are supported by a frame 140. The frame has a boundary 150 with tabs 160 for retaining the materials 120, 130 of the filter. The frame 140 also has a central bar 170 that contains at least one detent 180 that may be used to mate the frame 140 with the corresponding vent 110. In some embodiments, the central bar 170 spaces the high airflow material 120 away from the active carbon layer 130, and each material 120, 130 is braced between the corresponding tabs 160 and the central bar 170. Portions of the central bar 170 may be magnetized or may contain a magnet 205 in order to assist in mating the filter with the vent.

The filter 100 may contain indents or protrusions 190 for mating with the detents 180 of the vent 110. Accordingly, the interface between the filter 100 and a spine 200 of a faceplate 210 of the vent 110 may have two detents 180 that force alignment with indents or protrusions 190 of the spine 200. The elements in the spine may be, for example, light pipe holes, and the central bar 170 may be a light pipe, such that the vent itself may be able to display the status of the filter 100, or any other aspect of the system by utilizing the light pipe of the filter frame 140 or spine 190. Two magnets 205 may be further provided in the faceplate 210 to allow the filter to "snap" in place when the detents 180 strike home in the indents 190.

In addition to the faceplate 210, which may be removable, the vent 110 may be provided with a permanently installed vent portion 220, further comprising adjustable louvers 230. The louvers 230 may control the volume, and direction, of airflow into the room.

In some embodiments may be applied to a custom designed passive HVAC register further configured to maximize airflow through the filter, measure indoor air quality at the passive register, detect installation or removal of a filter and communicate the indoor air quality and filter status to a centralized server.

Figure 4A:
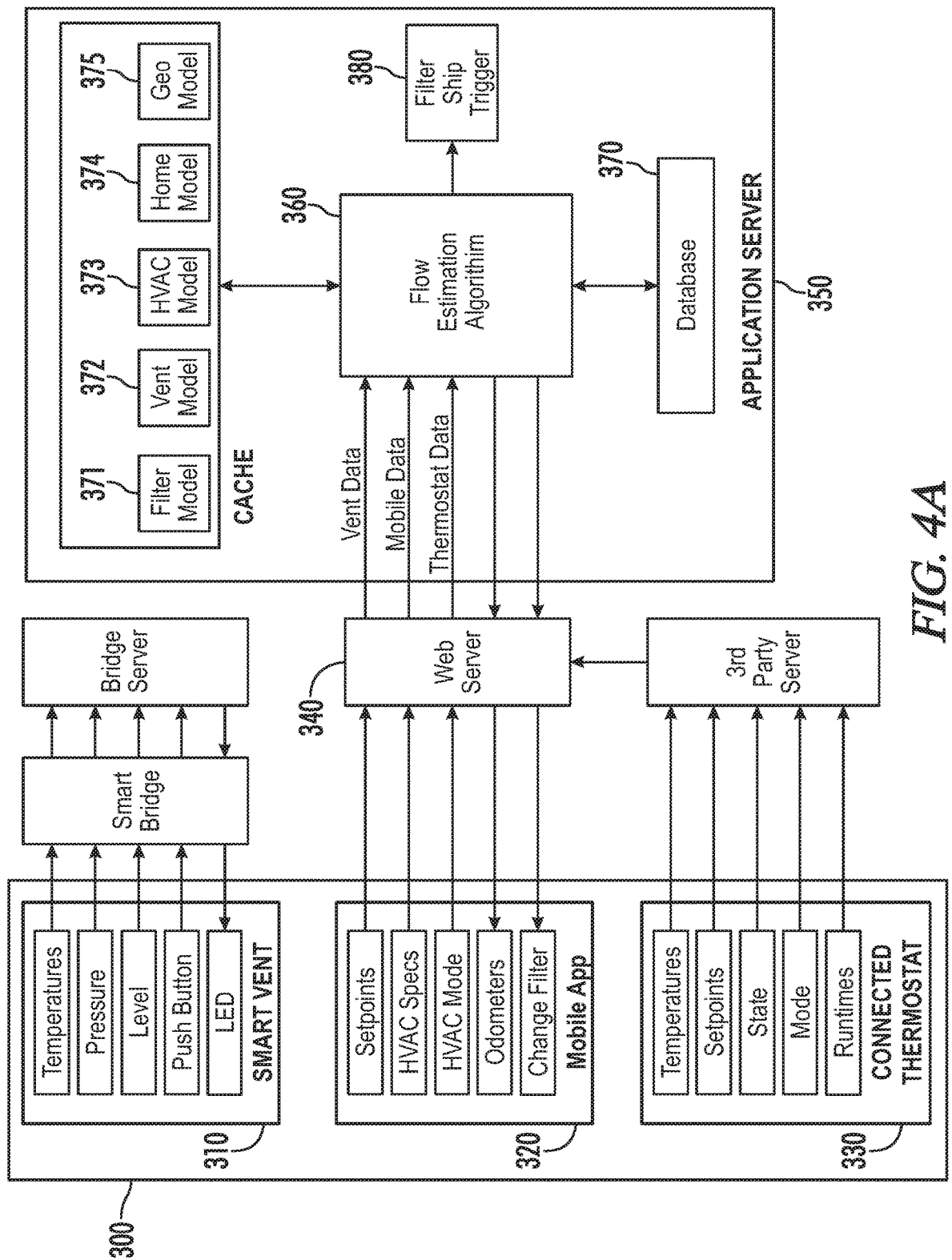
FIG. 4A is a system overview of a system for predicting failure of an air filter.
Figure 4B:
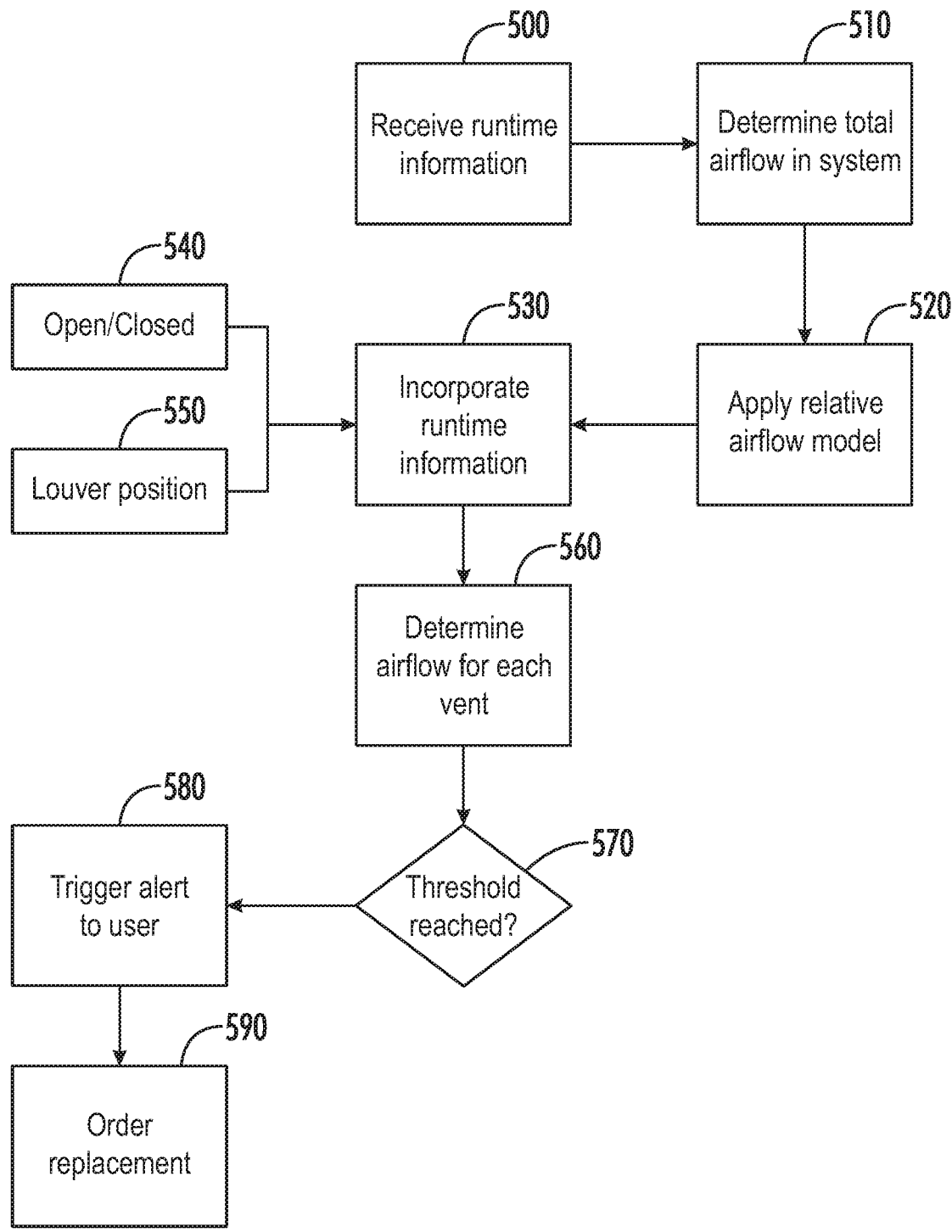
FIG. 4B is a flowchart illustrating a method for predicting failure of an air filter.

FIG. 4A is a system overview of a system for predicting failure of an air filter within an HVAC installation 300 and FIG. 4B is a flowchart illustrating a method for use with the system described. The HVAC installation 300 may be a "smart" installation, and may comprise at least one smart vent 310, which may be the vent 110 shown in FIGS. 2 and 3. The installation 300 may further include a connected thermostat 330, and a mobile application 320, where the mobile application 320 may be used to control the vent 310 and the thermostat 330 and to receive information from those components. In some embodiments, the installation 300 may further comprise an indoor air quality sensor integrated into the vent 310 or a sensor for detecting indoor air quality provided separately from the vent.

While the system overview illustrates only one smart vent 310 and only one connected thermostat 320, it will be understood that the installation 300 may contain multiple smart vents 310, such as vents installed in different rooms as well as multiple connected thermostats 320, such as thermostats controlling various zones of the installation 300. Further, while a mobile application 320 is shown and described, it may be replaced or supplemented by a traditional computer application or any other control system. In some embodiments, one or more components of the system may be missing or replaced. However, the method may collect missing information in alternative ways, or may replace such information with default values. Alternatively, if a user does not have connected components, such as a smart filter or a smart thermostat, various values may be entered manually at a user interface in the mobile application 320.

Each component of the HVAC installation 300 may relay information to a web server 340, either directly or by way of bridge servers or third party servers. Such information may be, in the case of the smart vent 310, temperature, pressure, louver level at the vent, and internal air quality (IAQ) detected at or near the vent. The vent 310 may also detect when a user pushes a button on the vent, and it may display information using an LED (such as one connected to the light pipe, discussed above). In the case of the connected thermostat 330, the information may be actual temperature, the temperature the thermostat is set to, the various setpoints utilized by the thermostat, the current state and mode of the thermostat, and the runtimes of the thermostat. In the case of the mobile application 320, the information may be the system setpoints, specification of the HVAC system, and the current mode of the HVAC system. The mobile application 320 may also be provided with data by the system, and may display to the user a running count of volumetric air provided through a vent 310, and may display an indication to change a filter 100 installed in the vent 310 when the filter 100 has reached its lifetime limit. This is typically determined by comparing the volumetric air provided to a threshold amount.

Accordingly, the system may further comprise an air filter 100, which may be installed within the vent 310 of the installation 300, and an application server 350 containing a processor.

The application server implements a flow estimation algorithm 360, which tracks a total amount of airflow through the HVAC installation 300 over time and may maintain a running total. The total may be reset, such as when new filters are installed in the system, or it may be a running lifetime total airflow through the installation 300. The running total accounts for the on/off cycles of the system, as well as for the modulated output of the system, such as when the system operates at a reduced capacity. The flow estimation algorithm relies on data from the vent 310, mobile application 320, and thermostat 330, as well as, in many cases, data retrieved from a database 370. The data from the various components of the installation 300 may be passed as data streams to the web server 340 using a proprietary API endpoint system.

Accordingly, as shown in FIG. 4B, the system may receive runtime information (500) for the HVAC installation 300 as a whole. Using such runtime information, the system may determine total airflow in the system (510). However, these values may be further refined based on additional data, as described.

Once the data is retrieved, the algorithm 360 may utilize a model of the aerodynamics of the filter 100, 371, a model of the fluid dynamics of the vent 310, 372, a model of the thermodynamics of the HVAC installation 300, 373, a model of the heat transfer properties of the user's home 374, and the historical weather data of the home's geographic location 375. These models may be based on machine learning algorithms, and may therefore improve over time. In some embodiments, the database 370 may store these models, or the various parameters of the models.

Returning to the method shown in FIG. 4B, based on the information available through the various models described, the flow estimation algorithm 360 may be applied (520) to determine what portions of the total airflow is routed through a particular smart vent 310 within the installation 300. Where the installation 300 only comprises a single smart vent 310, and contains no other outlet for airflow, the total airflow through that vent is simply the total airflow through the installation 300, potentially reduced by some amount of loss. The total airflow through the smart vent 310 is maintained as a tally of volumetric flow through the vent. Accordingly, the key output of the flow estimation algorithm 360 is the accumulated air volume that has passed through each vent 310. This running sum is sent to the mobile application 330 where it may be displayed (565) as an odometer style icon in a user interface.

The relative airflow model (applied at 520) may be further refined by incorporating information about the runtime of a particular vent (530). Accordingly, the airflow determined to have passed through a particular vent may be reduced if the vent is closed 540 or if a louver partially occludes 550 the airflow through the vent 310. Ultimately, all information available to the model may be used to determine the total airflow for each vent 310 (at 560). The running sum of air volume through each vent may be sent to the mobile application 330 where it may be displayed (565) in a user interface.

Either continuously or at regular intervals, the tally maintained by the flow estimation algorithm 360 is compared to a threshold amount (570), representing the total acceptable lifetime volumetric airflow through the filter 100. When the tally passes the threshold amount, the system triggers an alert (580) in order to inform a user that the filter 100 should be replaced. If the tally has not yet passed the threshold amount (at 570), the method may separately check a metric representing indoor air quality (IAQ) (at 575). If the IAQ metric is above a threshold amount, such as a threshold level of acceptable pollutants, or a threshold rate of increase of pollutants, as detected by a sensor at a vent 310, the system may similarly trigger an alert to the user (at 580). This alert may be a popup notification in the mobile application 320, or a designated status indication using the status LED on the vent 310, notifying the user that the filter is near the end of its useful life. In some embodiments, an alert is triggered at some percentage of the threshold amount, such as 90%, in order to inform the user that the filter 100 is nearing a failure point. Alternatively, the threshold amount may be set lower, such as at 90% of the acceptable lifecycle of the filter 100, in order to alert a user that failure is imminent.

In some embodiments, the flow estimation algorithm triggers an order to a vendor (590) for a replacement filter 380 when the tally passes the threshold amount. Once the filter reaches the end of its useful life, the status LED on the vent 310 may flash a special color pattern, warning the user that the filter 100 should be changed as soon as possible Typical installations 300 include multiple smart vents 310, with each vent controlling and routing air flow into a different room. In such installations, a tally is kept for each vent, and each tally is compared to the threshold volumetric quantity independently. In such an embodiment, when any of the tallies crosses the threshold volumetric quantity, an alert is triggered and identifies the particular vent for which the threshold has been crossed, and a corresponding replacement filter may be ordered 360.

Figure 5:
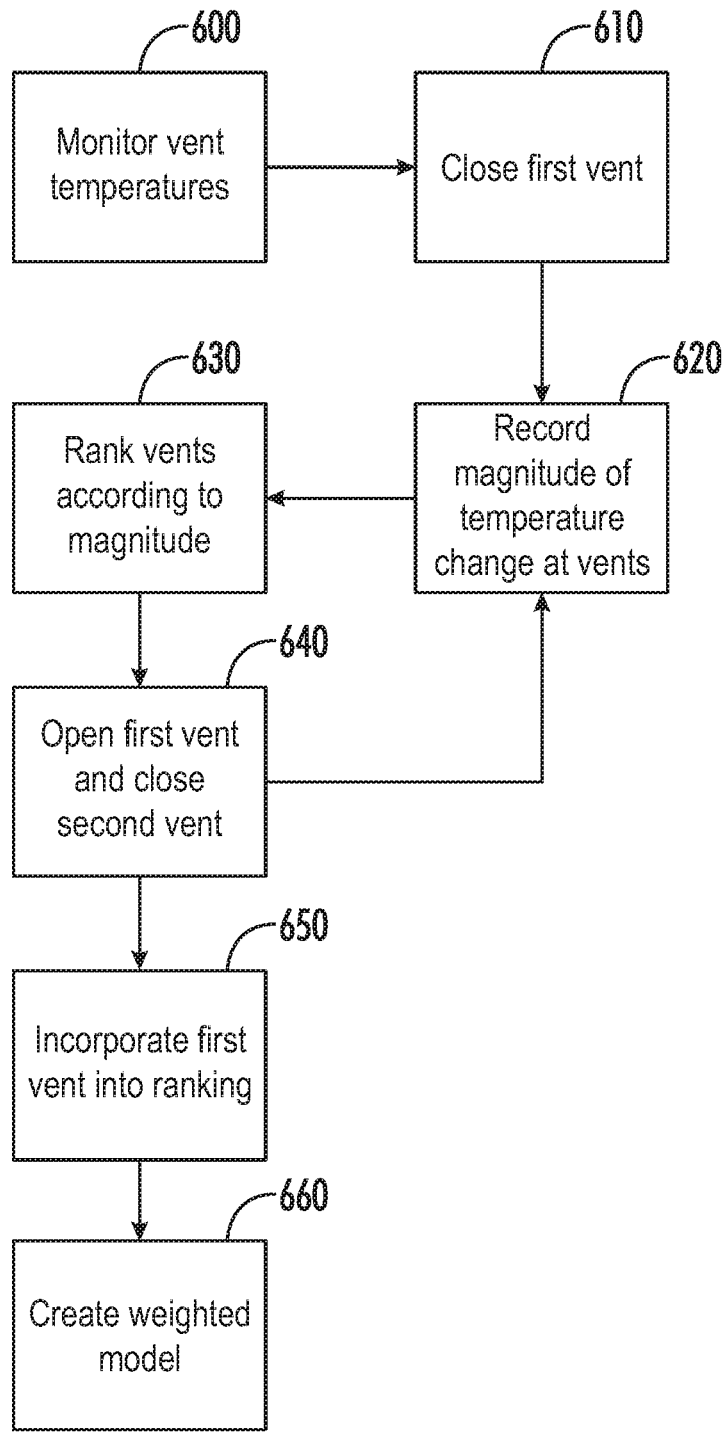
FIG. 5 is a flowchart illustrating a method for calibrating an HVAC system.
Figure 6:
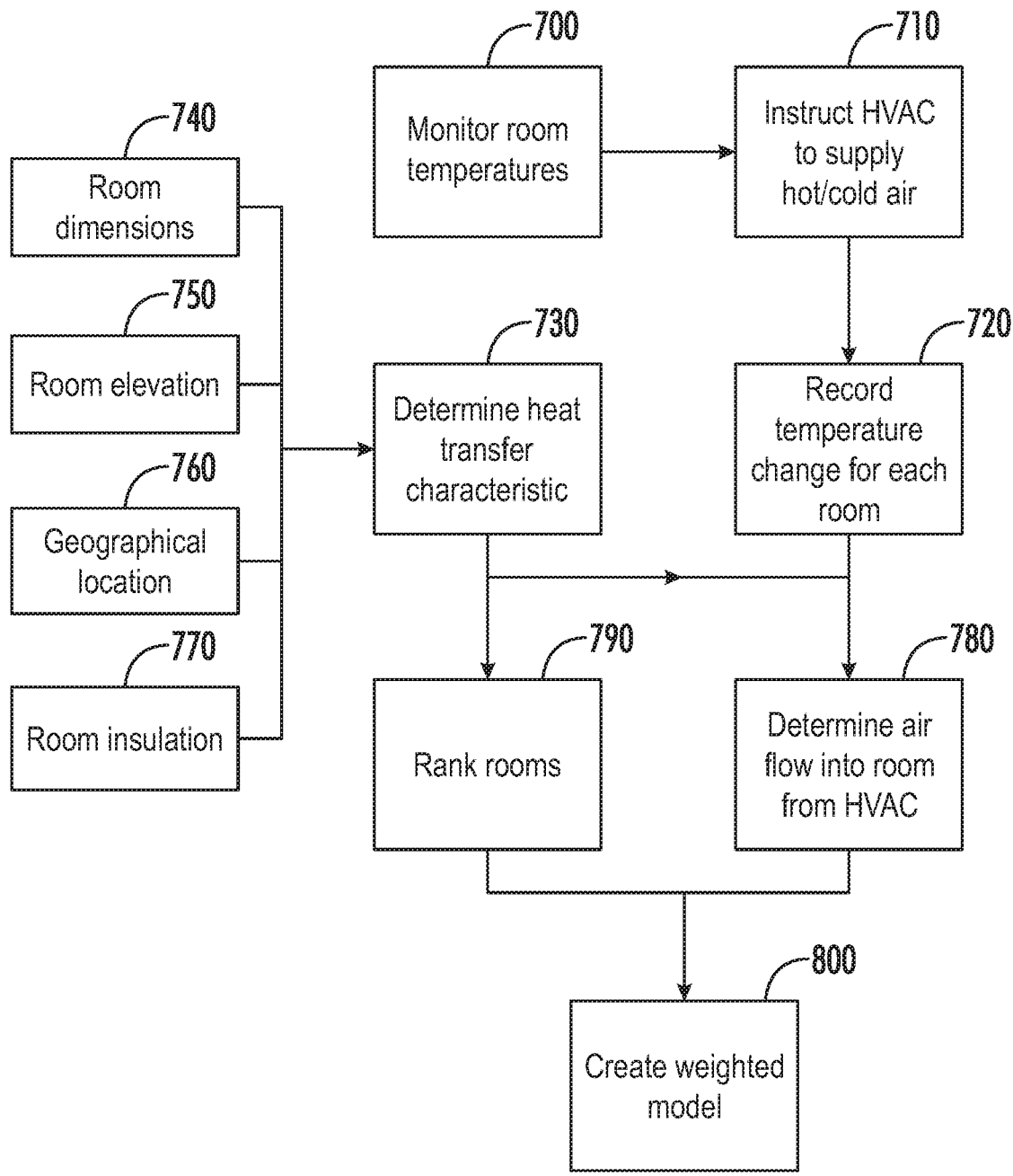
FIG. 6 is a flowchart illustrating an alternative method for calibrating an HVAC system.

In some embodiments containing multiple smart vents 310, the HVAC model 373 simply tells the system to assume that equal portions of the system airflow are routed to each of the vents 310. In such embodiments, the total airflow is divided by the total number of vents, and potentially reduced by some system loss, and each vent is assigned a portion of the calculated airflow. In other embodiments, the flow estimation algorithm utilizes a model of relative airflow calibrated to the particular installation 300. Various calibration methods for the model of relative airflow are discussed below with respect to FIGS. 5 and 6, illustrating how the models are generated. The methods for estimating flow are not mutually exclusive. The thermal capacity model, described below, may build on the relative flow model, or may act as a refining variable for the relative flow model, also described below, to increase accuracy, or it could be implemented independently. Similarly, the relative flow model builds on the HVAC runtime model, which does not require a model of relative flow (instead assuming that flow through all vents is equal).

Where the HVAC model 373 assumes equal flow, the calculations are based on an HVAC runtime. This method analyzes historical data from all vents 310 in the installation 300. Patterns in vent temperature data are used to identify when the HVAC system's air handler is running. These air handler events can be further broken down to indicate which mode the HVAC system was in: heating, cooling, or fan only. The filter's 310 usable life is given in terms of the total amount of time that the HVAC system was forcing air through the vents in the home. This method treats all vents as equal, and all HVAC systems as equal. An assumed average volumetric flowrate is multiplied by the HVAC runtime to estimate a common total airflow for the installed vents.

The models of relative airflow may instead assign a percentage of total airflow for each smart vent 310 in the installation 300, in which case the tally of volumetric airflow may be the total airflow multiplied by the percentage directed to that vent, or the model may simply rank the vents by their respective airflows. The model is then used to generate distinct tallies of volumetric airflow for each vent 310.

FIG. 5 shows a method for calibrating a relative flow model for the system described. Unlike the HVAC Runtime Method, the relative flow method does not treat all vents as equal. The accumulated air volume estimate is improved through the use of an air flow calibration subroutine. The purpose of this subroutine is to rank the vents according to their volumetric flow rates. There is a strong correlation between vent 310 temperature and volumetric flow rate. Accordingly, when a vent 310 is closed, the remaining vents 310 experience a temperature spike, the magnitude of which corresponds to the amount of flow increase, which correlates with the airflow through the vent 310. The method therefore compares spikes in the vent temperature data to determine which vents 310 maintain a higher flowrate than others.

Accordingly, in order to calibrate the model, the system monitors the temperature of each vent 310 (at 600) in the installation 300, typically while all vents 310 are open. A first of the vents 310 in the installation 300 is then closed (at 610) while the temperatures at each vent 310 continue to be monitored. A temperature change, or spike, at each vent is then calculated and recorded (at 620), and all vents 310 (other than the vent 310 that was closed) are ranked in order of the magnitude of the temperature change (630). This ranking provides a model of relative airflow in the various vents 310 in the installation 300.

After this first portion of the calibration routine, the vent 310 that was closed is not incorporated into the model. Accordingly, the first vent 310 is opened and a second vent 310 is closed (640), the magnitude of temperature change at each of the vents is monitored (at 620), and the ranking of the vents 310 is modified to incorporate the first vent 310 (at 650). While the ranking of the vents may provide a model, in some embodiments, the model may be improved by weighting the various vents based on the relative magnitude of the temperature change at each vent (660).

Accordingly, if some average flow rate for all vents is assumed, the relative flow rankings can be translated into absolute available flow rates.

Once the available flow is estimated for each vent 310 in the home, the system needs to account for the amount of flow that each Smart Vent actually allowed to enter the room. Accordingly, an additional model is needed to incorporate the relationship between louver level and flow blockage. This makes it possible to scale available flow down to allowed flow. It follows that the filter 100 attached to the vent 310 that allowed the most flow should require changing sooner than the others. In this way, combining flow rate analysis with runtime analysis (from the HVAC runtime model) yields a more accurate estimate of accumulated air volume than runtime analysis alone.

The model may be a dynamic model, and may take into account the positions of louvers 230 within each vent 310. The model may therefore be adjusted to account for a vent 310 that is closed or for which the louvers 230 partially occlude airflow.

FIG. 6 shows a calibration method for a thermal capacity based model for use with the system described. The accuracy of the relative flow method for calibrating the model is limited by the use of an assumed average flow rate for the vents in the home. The thermal capacity method, described here, makes no such assumption. Herein, the accumulated air volume estimate is improved through the use of a heat flow calibration subroutine. The purpose of this subroutine is to infer an absolute volumetric flow rate from a measured heat flow rate. There is a strong correlation between vent 310 temperature rate of change and room temperature rate of change. The rate of change of a room's temperature is directly proportional to the rate of heat transfer between the room and its surroundings.

Heat predominantly enters and exits a room through its surroundings and through the HVAC installation 300. If the transfer of heat between a room and its surroundings is approximately constant, a change in the room temperature rate of change can be ascribed to a change in the heat flow rate being supplied by the HVAC system. The amount of time it takes for a room to change temperature is used to infer what volume (or mass) of air was transferred to the room (by passing through a vent 310) during that time. This data can be gathered during the calibration subroutine or from historical vent temperature data. The accuracy of the thermal capacity method relies on the availability and accuracy of a home model 374 comprising metadata related to the home's thermal load and thermal capacity. This metadata includes room dimensions (740), room elevation (750), and geographical location (760). This metadata may be further supplemented by information about insulation characteristics of the room (770) for example. Room dimensional data can be provided by the user, or it can be acquired from image data. In the latter case, room dimensional data can be obtained using established image processing techniques on images captured from the user's mobile device or from a home surveillance system (e.g. Nest Cam).

In such a method, the system is calibrated by first determining, at the application server 350, a heat transfer characteristic for each of the rooms served by the installation 300 (at 730), typically based on the metadata discussed above. The method may be applied to each room individually as well. The method monitors a temperature for each of the rooms (700), and instructs the HVAC system to supply hot or cold air to the rooms (710). The method then records temperature changes for each room (at 720) and determines the amount of air flow into each of the rooms based on the change in temperature for the room (rather than at the vent 310). This information may be used to rank the plurality of rooms based on the air flow (at 780), or it may, instead, be used to determine an absolute amount of air that flowed into the room (at 790). Either the ranking (780) or the absolute amount of air flow (at 790) may be used to create a weighted model (at 800). Alternatively, the absolute amount of air flow may be used to directly generate the running volumetric tally of air flow discussed above.

Figure 7:
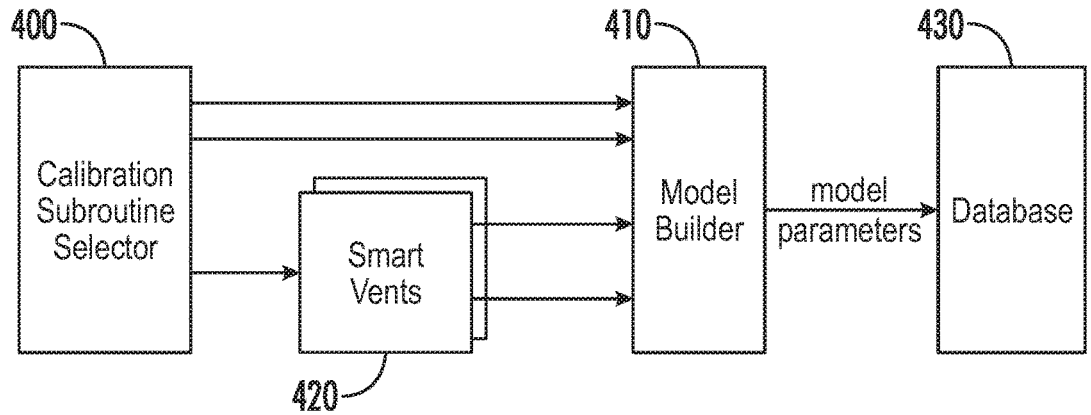
FIG. 7 is a block diagram showing the flow of data in a calibration method for use in the system of FIG. 4A.

FIG. 7 is a block diagram showing the flow of data in a calibration method for use in the system of FIG. 4. For the various methods described, the application server 350 implements a calibration subroutine selector 400 to determine which calibration subroutine to implement based on available data. The selector then provides the model type to be built and all relevant metadata to a model builder 410 while transmitting instructions to the smart vents 310 themselves. The instructions to the smart vents 310 may indicate a level sequence 420 to implement, such as instructing the vents 310 to close sequentially (as described above with respect to the methods). Accordingly, a first of the vents 310 may close and all vents 310 may then transmit information about their respective louver levels and their temperatures to the model builder 430. The model builder 410 may then build the HVAC model 373 and transmit all parameters to the database 370.

Figure 8:
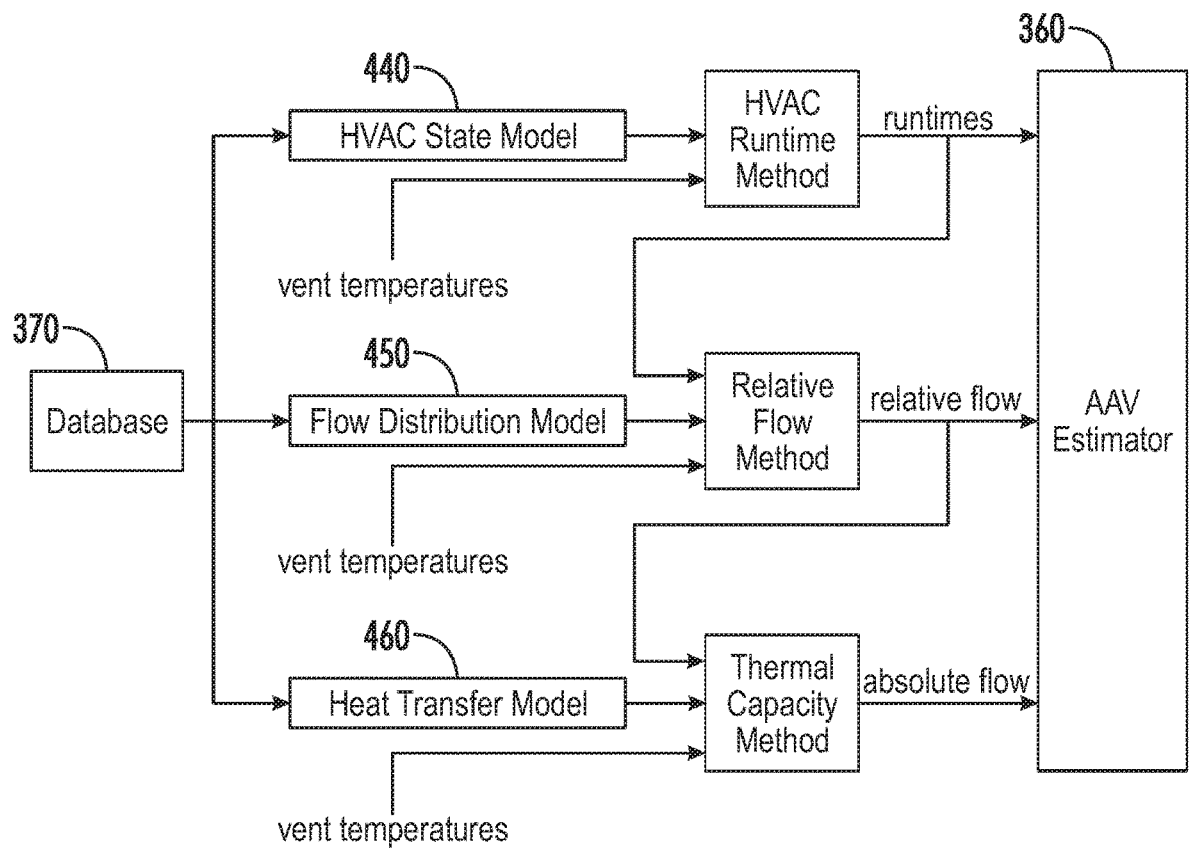
FIG. 8 is a block diagram showing the flow of data during use of the system of FIG. 4A.

FIG. 8 is a block diagram showing the flow of data during use of the system of FIG. 4A and illustrating the relationship between the various models described above. As shown, the database 370 provides the parameters for each model, and the HVAC state model 440, the flow distribution model 450, and the heat transfer model 460 act in concert to implement their corresponding methods and provide data about runtime of the installation 300, relative flow at each of the vents 310, and the absolute value of the flows to the flow estimation algorithm 360. This configuration may be used to generate more accurate values for the total volumetric flow than any of the methods could alone.

In addition to determining the lifespan of the vents, the system described may be used to extend the life of the system or to make suggestions based on the use data of various components of the system. For example, the louvers 230 may be monitored by the system, and the system may suggest ways to extend the life of a filter based on the louver positions. For example, if the louvers 230 in a particular vent 110 are pointed directly upwards, such that all airflow is directed to the top of the vent 110, the system may suggest flipping a filter 100 in order to utilize a largely unused lower half of the filter 110.

In some embodiments, the system is configured to further monitor indoor air quality using sensors integrated into the vents 110 or third party sensors incorporated into the system. Such sensors may communicate indoor air quality to the central server and, in some cases, may be considered in determining the life span of a filter. For example, if the indoor air quality drops, the system may alert the user or trigger the ordering of a replacement filter. The details of air quality may further be reported to a user through the user interface, such as the mobile application 320.

Further, the indoor air quality detection may be leveraged to incorporate additional smart features into the system. For example, in some embodiments, when a low indoor air quality is detected, the system may turn on the HVAC fan as part of an "air washing cycle." Such a cycle may run for a predetermined amount of time, or until the indoor air quality sensors indicate that quality has returned to an acceptable level.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" and like terms encompass all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A method for predicting failure of an air filter comprising:
    receiving, at a processor, information about a total volume of air pumped by an HVAC system over time, the HVAC system comprising a plurality of vents, each vent having an associated air filter;
    receiving, at the processor, information about which vents of the plurality of vents are open;
    determining a volumetric quantity of air passing through each of the plurality of vents based on the information about the total volume of air and based on which of the plurality of vents are open;
    maintaining a tally of volumetric flow through each vent of the plurality of vents;
    comparing the tally of volumetric quantity of air passing through each vent of the plurality of vents to a threshold volumetric quantity of air; and
    triggering a warning to a user upon determining that the tally of the volumetric quantity associated with any vent of the plurality of vents is greater than the threshold volumetric quantity, wherein the warning indicates the vent associated with the volumetric quantity that triggered the alert,
    changing the filter for the vent associated with the volumetric quantity that triggered the alert in response to the warning triggered,
    wherein the volumetric quantity associated with each of the plurality of vents is different from the volumetric quantities associated with the other of the plurality of vents and is calculated based on a model of relative airflow correlated with the total volume of air in the HVAC system,
    wherein the model of relative airflow is dynamic and takes into account which vents are open at any given time, and
    wherein the model of relative airflow is generated by:
        monitoring a temperature at each of the plurality of veins in the system;
        closing a first of the plurality of vents while continuing to monitor the temperature at each of the plurality of vents; and
        ranking the remaining vents according to a magnitude of a change in the temperature monitored at the corresponding vent;
        wherein the ranking of the remaining vents is the model of relative airflow in the system.

2. The method of claim 1 further comprising transmitting an order to a vendor to provide a new filter when the tally of the volumetric quantity of air is greater than the threshold volumetric quantity of air and wherein the changing of the filter is upon receipt of the new filter from the vendor.

3. The method of claim 1 wherein the model of relative airflow indicates a percentage of total flow directed through each vent in the HVAC system, and wherein the volumetric quantity associated with a vent is determined by multiplying the total volume of air pumped by the HVAC system by the percentage of total flow directed through the corresponding vent.

4. The method of claim 1 wherein the model of relative airflow takes into account the position of louvers of each vent.

5. The method of claim 1 further comprising:
    receiving an indication of internal air quality at the at least one vent over time;
    determining a rate of change of the internal air quality at the at least one vent;
    comparing the rate of change of internal air quality at the at least one vent to a threshold rate of change;
    triggering a warning to a user if the rate of change of the internal air quality at the at least one vent is greater than the threshold rate of change.

6. The method of claim 1 further comprising:
    opening the first of the plurality of vents;
    closing a second of the plurality of vents;
    monitoring the magnitude of temperature change at each of the vents; and
    modifying the ranking in order to incorporate the first vent.

7. The method of claim 6 further comprising weighting the model of relative airflow based on the relative magnitudes of the changes in temperature and determining a percentage of total air flow for each vent.

8. The method of claim 1 further comprising resetting the tally of volumetric flow through the vent associated with the volumetric quantity that triggered the alert after changing the filter for the corresponding vent.

9. A method for predicting failure of an air filter comprising:
    receiving, at a processor, information about a total volume of air pumped by an HVAC system over time, the HVAC system comprising a plurality of vents, each vent having an associated air filter;
    receiving, at the processor, information about which vents of the plurality of vents are open;
    determining a volumetric quantity of air passing through each of the plurality of vents based on the information about the total volume of air and based on which of the plurality of vents are open;

maintaining a tally of volumetric flow through each vent of the plurality of vents;

comparing the tally of volumetric quantity of air passing through each vent of the plurality of vents to a threshold volumetric quantity of air; and triggering a warning to a user upon determining that the tally of the volumetric quantity associated with any vent of the plurality of vents is greater than the threshold volumetric quantity, wherein the warning indicates the vent associated with the volumetric quantity that triggered the alert, changing the filter for the vent associated with the volumetric quantity that triggered the alert in response to the warning triggered, wherein the volumetric quantity associated with each of the plurality of vents is different from the volumetric quantities associated with the other of the plurality of vents and is calculated based on a model of relative airflow correlated with the total volume of air in the HVAC system, wherein the model of relative airflow is dynamic and takes into account which vents are open at any given time, and wherein the model of relative airflow is generated by:
   determining, at a processor, a heat transfer characteristic for each of a plurality of rooms served by the system;
   monitoring a temperature for each of the rooms;
   instructing the HVAC system to supply hot or cold air to each of the rooms while monitoring the temperature for each of the rooms;
   determining air flow into each of the rooms based on a change in temperature for the room and the heat transfer characteristic for the room; and
   ranking the plurality of rooms based on air flow,
   wherein the ranking of the plurality of rooms is the model of relative airflow in the system.

10. The method of claim 9 wherein the heat transfer characteristic is based on room dimensions, room elevation, and geographical location of the room.

11. The method of claim 10 wherein room dimensions are determined based on an image of the room.

12. The method of claim 9 further comprising resetting the tally of volumetric flow through the vent associated with the volumetric quantity that triggered the alert after changing the filter for the corresponding vent.

* * * * *